United States Patent Office 3,341,624
Patented Sept. 12, 1967

3,341,624
TRITHIOPHOSPHATE ESTERS AS FLAME-RE-
TARDANT AGENTS FOR THERMOPLASTIC
PRODUCTS
Allan Ellis Sherr, Norwalk, Conn., and Helen Currier
Gillham, Princeton, N.J., assignors to American Cyanamid Company, Stamford, Conn., a corporation of Maine
No Drawing. Filed July 22, 1966, Ser. No. 567,075
8 Claims. (Cl. 260—887)

ABSTRACT OF THE DISCLOSURE

Flame retardance is imparted to thermoplastic polymers by incorporation of trithiophosphates of the formula $$(RS)_3P=O$$

wherein R is an aryl ($C_6$–$C_{10}$), alkaryl ($C_7$–$C_{11}$) or aralkyl ($C_7$–$C_{11}$) radical.

This application is a continuation-in-part of our copending application Ser. No. 333,653, filed Dec. 26, 1963 now abandoned.

More particularly, this invention relates to novel flame-retardant compositions comprising certain thermoplastic polymers containing a flame-retarding amount of an S,S,S-trisubstituted trithiophosphate having the formula (I)                $(RS)_3P=O$ wherein R is an aryl ($C_9$–$C_{10}$), alkaryl ($C_7$–$C_{11}$) or aralkyl ($C_7$–$C_{11}$) radical.

The use of various materials incorporated into thermoplastic resins in order to improve the flame-retardance thereof has been known in the prior art. Many compounds are commercially available for such a use, among them being chlorostyrene copolymers, chlorinated paraffin wax in admixture with triphenyl stibine, chlorinated paraffins and aliphatic antimonyl compounds, as well as antimony oxide-chlorinated hydrocarbon mixtures. A drawback of these compounds, however, has been the fact that generally a large amount, i.e. upwards of 35%, of additive must be incorporated into the resin in order to make it sufficiently flame-retardant. Also these prior art additives tend to crystallize or oil out of the resin after a relatively short time of incorporation. We have now found a group of compounds which may be added to thermoplastic resins in relatively small amounts and still result in the production of satisfactory flame-retardant compositions and which will not crystallize or oil out of the resin after incorporation therein.

The production of thermoplastic resin compositions which are flame-retardant, i.e. have high resistance to burning, is of considerable commercial importance. For example, such articles as castings, moldings, foamed or laminated structures and the like are required, or at least desired, to be resistant to fire and flame and to possess the ability to endure heat without deterioration. Typical illustrations of such applications can be found in castings for live electrical contacts which should not be ignited or deteriorated by heat and sparks. Structural members as pipes, wall coverings, wall paneling, windows and items such as ash trays, waste baskets, fibers and the like are further examples of products wherein flame-retardance is desirable.

It is therefore an object of the present invention to provide novel flame-retardant thermoplastic resin compositions.

It is a further object of the present invention to provide flame-retardant compositions comprising thermoplastic polymers and a flame-retarding amount of a trisubstituted thiophosphate represented by Formula I, above.

These and further objects will become more apparent to those skilled in the art upon reading the more detailed description set forth hereinbelow.

THE THERMOPLASTIC POLYMERS

The thermoplastic polymers into which the flame-retardant agents may be incorporated to produce the novel compositions of the present invention, are generally the vinyl type polymers wherein the monomeric material is polymerized, by any known method, via the vinyl unsaturation therein and which have only hydrogen, carbon or halogen atoms attached directly to the chain of the polymer. Examples of the vinyl type polymers which may be used to form our novel compositions are the vinyl halides, the vinylidene halides, the vinyl acetates, polyvinyl butyral, butadiene copolymers, acrylonitrile-butadiene-styrene polymers, the acrylonitriles, etc. Additionally and preferably, one may incorporate the flame-retardant agents mentioned above into such polymers as the α-olefin polymers, such as the homopolymers and copolymers, etc. containing, as the major constituent, ethylene, propylene, and the like and the acrylates and methacrylate polymers produced from monomers having the formula (II)

wherein $R^1$ is a hydrogen or methyl radical and $R^2$ is a hydrogen or an alkyl radical having from 1 to 6 carbon atoms, inclusive. Examples of monomers represented by Formula II include acrylic acid, methacrylic acid, methyl acrylate, ethyl acrylate, n-propyl acrylate, isopropyl acrylate, n-butyl acrylate, t-butyl acrylate, isobutyl acrylate, n-ampl acrylate, t-amyl acrylate, hexyl acrylate and their corresponding alkyl methacrylates.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly the allyl, methallyl, vinyl methvinyl, butenyl, etc., unsaturated esters of aliphatic and aromatic monobasic acids such, for instance, as acetic, propionice, butyric, crotonic, succinic, glutaric, adipic, malic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., diallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.;

methylene malonic esters, e.g., methylene methyl malonate, etc.

Other examples of monomers that can be used as polymers to form the resin portion of our novel flame-retardant compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized in useful polymers, useful in the production of our novel flame-retardant compositions, are allyl alcohol, methallyl alcohol, diallyl carbonate, allyl lactate, allyl alphahydroxyisobutyrate, allyl trichlorosilane, diallyl phthalate, diallyl methylgluconate, diallyl tartronate, diallyl tartrate, diallyl mesaconate, the diallyl ester of diallyl chlorophthalate, diallyl dichloromuconic acid, diallyl chlorophthalate, diallyl dichlorosilane, the diallyl ester of endomethylene tetrahydrophthalic anhydride, triallyl tricarballylate, triallyl cyanurate, triallyl isocyanurate, triallyl citrate, triallyl phosphate, tetrallyl silane, tetraallyl silicate, hexallyl disiloxane, allyl diglycol carbonate, etc. Other examples of allyl compounds that may be employed are given, for example, in U.S. Patent No. 2,510,503, issued June 6, 1950.

These above mentioned monomers may be polymerized, copolymerized, etc., in any known manner such as by free-radical generating catalysts, irradiation, anion and cation type catalysts and the like, said method of polymerization forming no part of the present invention.

THE TRITHIOPHOSPHATE COMPOUNDS

As mentioned above, we have discovered that the addition of certain trithiophosphates, stable to processing conditions, to a thermoplastic resin results in the production of resinous compositions having excellent flame-retardant properties. These trithiophosphates may be incorporated into the resins in flame-retarding amounts, i.e. generally amounts ranging from about 15%, by weight, to about 35%, by weight, preferably 15% to 25%, by weight, based on the weight of the polymer, have been found sufficient.

The trithiophosphates can be incorporated into the resins by any known method. That is to say, the flame-retardant additive may be added to the resin by milling the resin and the trithiophosphate on, for example, a two-roll mill, in a Banbury mixer, etc., or the trithiophosphate may be added by molding or extruding it and the resin simultaneously, or by merely blending the resin in powder form with it and thereafter forming the final desired article. Additionally, the trithiophosphate may also be added during the resin manufacture, i.e., during the polymerization procedure by which the resin is made, provided the catalyst etc. and other ingredients of the polymerization system are inert thereto.

The trithiophosphates set forth hereinabove may be produced in any known manner without varying from the scope of the present invention. Exemplary procedures for the production of the compounds represented by Formula I, above, are set forth in such articles as: Autenrieth et al., Ber., 33, 2111 (1900), Michaelis et al., Ber., 40, 3419 (1907), Tasker et al., J. Chem. Soc., 95, 1910 (1909).

Further procedures, for example, comprise reacting sodium metholate with an appropriate thiol to produce the corresponding sodium thiolate and methanol. The reaction is conducted at room temperature in an ice bath to maintain said temperature as a result of a slight exotherm. The ingredients are stirred for from about 5 to 10 minutes under anhydrous conditions and in the presence of an inert solvent. The sodium thiolate compound is then recovered and reacted with phosphoryl chloride in ether and with the application of slight heat. The subject thiophosphate and sodium chloride are produced and the thiophosphate is recovered by asperating the ether, distilling, precipitating out the compound a filtering.

Additionally, one may prepare the trithiophosphate by reacting an appropriate thiol with phosphorus trichloride at 150° C. to produce the corresponding trithiophosphite. This compound is then reacted with hydrogen peroxide at from 30 to 70° C. to produce the desired trithiophosphate.

It should be noted that the above methods for the preparation of the trithiophosphate compounds which are used to produce our novel compositions according to the present invention form no part of the scope thereof.

Examples of trithiophosphate compounds which are represented by Formula I and are therefore useful in producing the novel compositions of our invention include S,S,S-triphenyl trithiophosphate, S,S,S-trinaphthyl trithiophosphate, S,S,S-tris(p-methylphenyl)trithiophosphate, S,S,S-tris(o,S,S,S-tris-(o-ethylphenyl) trithiophosphate, S,S,S-tris(p-n-butyl-p-dimethylphenyl) trithiophosphate, S,S,S-tris(m-amylphenyl) triphenyl) trithiophosphate, S,S,S-tris(2-methyl-1-naphthyl) trithiophosphate, S,S,S-tribenzyl trithiophosphate, S,S,S-tris(2-phenethyl) trithiophosphate, S,S,S-tris(4-phenylbutyl) trithiophosphate, S,S,S-tris(3-phenylpentyl) trithiophosphate, S,S,S-tris(naphthylmethyl) trithiophosphate, and the like.

It is also within the scope of the present invention to incorporate such ingredients as plasticizers, dyes, pigments, stabilizers, antioxidants, antistatic agents and the like to our novel compositions.

The following examples are set forth for purposes of illustration only and are not to be construed as limitations on the present invention except as set forth in the appended claims. All parts and percentages are by weight unless otherwise specified.

Any appropriate flame-retardance test may be used to determine the flame-retardance properties of any specific compound. One test which is reasonably efficient is that designated as a modified version of ASTM test D–635–56T. The specifications for this test are: a specimen, 5″ in length, 0.5″ in width and 0.045″ in thickness, is marked at the 1″ and 4″ lengths and is then supported with its longitudinal axis horizontal and its transverse axis inclined at 45° to the horizontal. A Bunsen burner with a 1″ blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4″ mark, the specimen is designated as "self-extinguishing" or "flame-retardant."

Example 1

Eighty (80) parts of polyethylene and 20 parts of S,S,S-triphenyl trithiophosphate are milled together on a two roll mill at about 170° C. The resulting milled composition is molded into strips 5″ in length, 0.5″ in width and 0.45″ in thickness and said strips are then subjected to an art recognized flame-retardance test. The strips pass the test and are therefore designated as flame-retardant.

Following the procedure of Example 1, the following examples were carried out utilizing other flame-retardant agents and various thermoplastic resin polymers. The results of these examples are set forth in Table I, below. In each instance, except Examples 31–33, the resultant plastic trithiophosphate mixture passed the flame-retardance test and was designated as flame and fire-retardant. In the table, PE=polyethylene; PP=polypropylene; PMMA= poly(methyl methacrylate); PA=poly(acrylic acid); AN=acrylonitrile; ST=styrene; BD=butadiene and MMA=methyl methacrylate; PST=polystyrene; comp.= comparative.

TABLE I

| Ex. | Thermoplastic Resin | Additive, R | Percent |
|---|---|---|---|
| 2 | PMMA | phenyl | 15 |
| 3 | PE | H₃C—C₆H₄— (p-tolyl) | 20 |
| 4 | PP | H₅C₂—C₆H₃(CH₃)— | 25 |
| 5 | PE | H₉C₄—C₆H₄— | 20 |
| 6 | PMMA | naphthyl | 15 |
| 7 | PA | C₆H₅—CH₂— | 20 |
| 8 | Terpolymer MMA/ST/AN 71/19/10 | C₆H₅—C₂H₄— | 25 |
| 9 | Mixture of BD-AN (10-75%) and AN-ST (25-90%).¹ | C₆H₅—C₅H₁₀— | 20 |
| 10 | PE | naphthyl—CH₂— | 15 |
| 11 | PP | methylnaphthyl | 20 |
| 12 | PMMA | methylnaphthyl | 20 |
| 13 | PP | phenyl | 20 |
| 14 | PMMA | H₃C—C₆H₄— | 15 |
| 15 | Terpolymer MMA/ST/AN 71/19/10 | H₅C₂—C₆H₃(CH₃)— | 25 |
| 16 | Mixture of BD-AN (10-75%) and AN-ST (25-90%).¹ | H₉C₄—C₆H₄— | 20 |
| 17 | PE | naphthyl | 25 |
| 18 | PP | naphthyl—CH₂— | 20 |
| 19 | PMMA | C₆H₅—C₂H₄— | 20 |
| 20 | PE | C₆H₅—C₅H₁₀— | 25 |
| 21 | PMMA | naphthyl—CH₂— | 20 |
| 22 | PE | methylnaphthyl | 25 |
| 23 | PMMA | methylnaphthyl | 20 |
| 24 | PP | methylnaphthyl | 25 |
| 25 | PE | methylnaphthyl | 25 |
| 26 | PE | C₆H₅—C₂H₄— | 20 |
| 27 | PMMA | C₆H₅—CH₂— | 15 |
| 28 | PA | H₃C—C₆H₄— | 15 |
| 29 | PA | naphthyl | 15 |
| 30 | Terpolymer MMA/ST/AN 71/19/10 | naphthyl | 25 |
| 31 (comp.) | PE | phenyl | ²0 |
| 32 (comp.) | PE | phenyl | ²5 |
| 33 (comp.) | PE | phenyl | ²10 |
| 34 | PE | phenyl | 15 |
| 35 | PST | H₃C—C₆H₄— | 15 |

¹ U.S. Patent No. 2,439,202.
² Specimen burned vigorously until consumed.

We claim:
1. A flame-retardant composition comprising a thermoplastic polymer produced from at least one ethylenically unsaturated monomer wherein only hydrogen, carbon or halogen atoms are attached directly to the chain of the polymer and from about 15% to about 35%, by weight, based on the weight of the polymer, of a compound having the formula

$$(RS)_3P=O$$

wherein R is selected from the group consisting of an aryl ($C_6$–$C_{10}$) radical, an alkaryl ($C_7$–$C_{11}$) radical and an aralkyl ($C_7$–$C_{11}$) radical.

2. A flame-retardant composition according to claim 1 wherein said thermoplastic polymer is a polymer of an α-olefin.

3. A flame-retardant composition according to claim 1 wherein said thermoplastic polymer is polyethylene.

4. A flame-retardant composition according to claim 1 wherein the thermoplastic polymer is a polymer of a compound having the formula

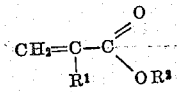

wherein $R^1$ is selected from the group consisting of hydrogen and a methyl radical and $R^2$ is selected from the group consisting of hydrogen and an alkyl radical having from 1 to 6 carbon atoms, inclusive.

5. A flame-retardant composition according to claim 1 wherein the thermoplastic polymer is poly(methyl methacrylate).

6. A flame-retardant composition according to claim 1 wherein the thermoplastic polymer is a mixture of (A) a butadiene-acrylonitrile copolymer and (B) an acrylonitrile-styrene copolymer, the amount of A and B ranging from about 10–75% to 90–25%, by weight, respectively.

7. A flame-retardant composition according to claim 1 wherein said compound is S,S,S-triphenyl trithiophosphate.

8. A flame-retardant composition according to claim 1 wherein said thermoplastic polymer is a polymer of styrene.

References Cited

UNITED STATES PATENTS 3,251,804  7/1966  Graham _____ 260—45.7

OTHER REFERENCES

Modern Plastics, vol. 41, No. 1, pp. 166, 167, 218, and 219.

DONALD E. CZAJA, *Primary Examiner.*

M. J. WELSH, *Assistant Examiner.*